United States Patent [19]

Vasilow et al.

[11] Patent Number: 4,606,434
[45] Date of Patent: * Aug. 19, 1986

[54] RESISTIVE CERAMIC BUSHINGS FOR BRAKE LINING WEAR SENSOR

[75] Inventors: Theodore R. Vasilow, Flint; Bernard J. Busovne, Jr., Davison; Gregory J. Johnson, Grand Blanc, all of Mich.

[73] Assignee: General Motors Corporation, Detroit, Mich.

[*] Notice: The portion of the term of this patent subsequent to Aug. 19, 2003 has been disclaimed.

[21] Appl. No.: 649,060

[22] Filed: Sep. 10, 1984

[51] Int. Cl.$^4$ .................. B60Q 1/00; F16D 66/02
[52] U.S. Cl. ........................... 188/1.11; 340/52 A; 200/61.4
[58] Field of Search .............. 188/1.11; 200/61.4; 192/111 A; 340/52 C, 52 A; 501/90, 92

[56] References Cited

U.S. PATENT DOCUMENTS

| | | | |
|---|---|---|---|
| 2,217,176 | 10/1940 | Madison | 188/1.11 |
| 3,052,814 | 9/1962 | Edwards et al. | 313/131 R |
| 3,641,546 | 2/1972 | Blackburn | 340/661 |
| 3,673,588 | 6/1972 | Riff | 340/661 |
| 3,813,665 | 5/1974 | Parfomak et al. | 340/661 |
| 4,298,857 | 11/1981 | Robins et al. | 340/52 A |
| 4,332,909 | 6/1982 | Nishida et al. | 501/92 |
| 4,387,789 | 6/1983 | Borugian | 188/1.11 |

FOREIGN PATENT DOCUMENTS 0601267  4/1978  U.S.S.R. .................. 501/92

*Primary Examiner*—Bruce H. Stoner, Jr.
*Assistant Examiner*—Alvin Oberley
*Attorney, Agent, or Firm*—Warren D. Hill

[57] ABSTRACT

A brake lining wear sensor includes a metal contact secured to a grounded brake lining support plate through a semiconductive ceramic bushing containing silicon carbide and silicon nitride which establishes an electrical resistance between the contact and the support plate so that the contact has a resistance to ground when the brake lining is not worn, but when the brake lining is worn and the contact touches a grounded brake rotor or drum, a short to ground occurs. The sensor is coupled by a lead wire to an indicator circuit which senses the resistance value in the circuit path to ground to determine whether the contact is connected to the indicator circuit and whether it is electrically grounded to the rotor. An indicator lamp comprises a tri-color LED to emit different colors signifying a normal condition, an open circuit, or a worn brake lining condition.

3 Claims, 3 Drawing Figures

RESISTIVE CERAMIC BUSHINGS FOR BRAKE LINING WEAR SENSOR

This invention relates to a brake lining wear sensor and particularly to such a sensor having resistive ceramic bushings.

In the case of either disc brakes or drum brakes, a brake lining on a nonrotating element engages a brake drum or rotor and with extended usage the brake lining will eventually wear away. To advise the operator of a worn condition requiring lining replacement, it has become the practice on some vehicles to place a contact on the brake lining support which extends toward the rotating element to a position representing the desired lining wear limit. The contact, when it engages the rotating element, makes a noise audible to the operator, or completes an electrical circuit to light an indicator lamp in view of an operator. The U.S. Pat. No. 2,217,176 to Madison exemplifies the latter type of arrangement where a contact fastened to a brake shoe completes an electrical circuit through the brake drum when the brake lining wears to the limit value. The contact is insulated from the brake shoe so that an electrical circuit can be completed only when the lining wear limit has been reached. The contact is connected to an indicator through a lead wire, and in the event that the lead becomes disconnected from the contact or becomes broken, no indication will occur when the brake lining wear reaches its limit.

It is therefore a general object of the invention to provide an electrical brake lining wear sensor for providing information regarding brake wear as well as circuit integrity. It is a further object to provide a durable ceramic semiconductor element as an element of the sensor.

The invention is carried out by providing a contact mounted on a brake lining support and coupled to the support through a semiconductor material such that a normally high resistance within a predetermined range is present between the contact and ground but when the break wear limit is reached, a short to ground occurs. The invention is further carried out by employing as the semiconductor material a durable ceramic composition comprising silicon carbide and silicon nitride.

The above and other advantages of the invention will become more apparent from the following description taken in conjunction with the accompanying drawings wherein like reference numerals refer to like parts, and wherein.

The invention is described herein in the context of automotive disc brakes. However, it is not limited to that application and certainly applies equally well to drum brakes as well as to nonautomotive applications wherever brake linings are used.

Figure 1:
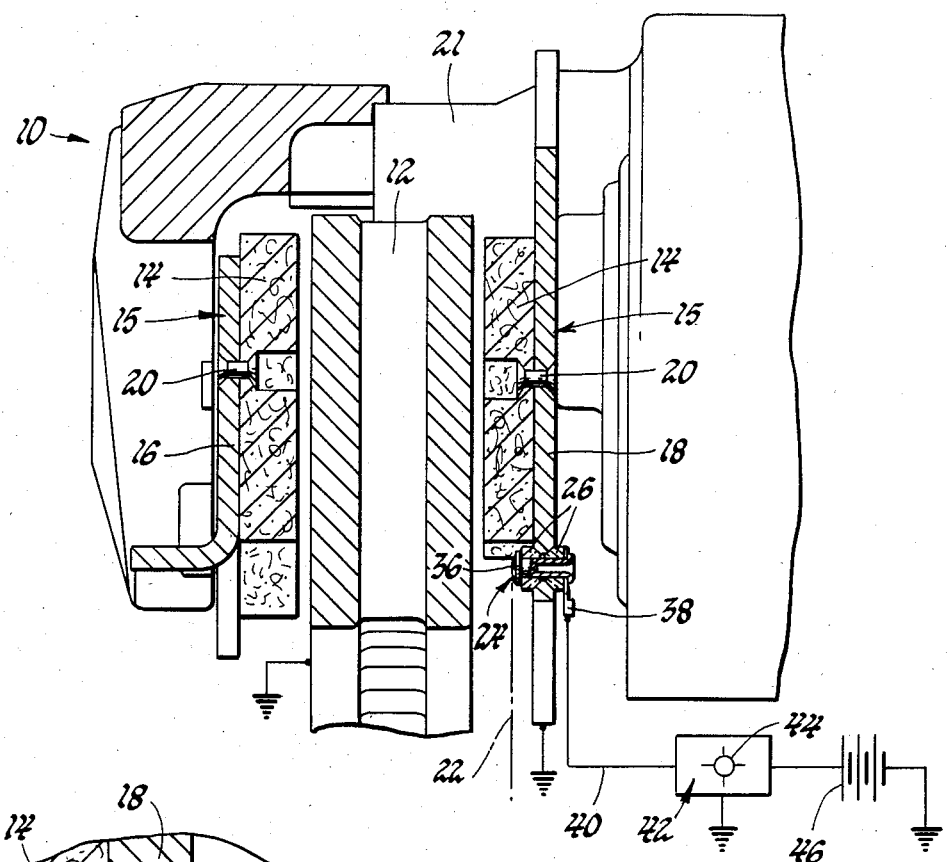
FIG. 1 is a partial sectional view of a disc brake arrangement including a sensor according to the invention.

Referring to FIG. 1, a disc brake assembly 10 comprises a rotor 12 positioned between a pair of brake pads 15 each having a brake lining 14 mounted by rivets 20 on backing plates or support 16 and 18 respectively. During brake operation, the pads 15 are squeezed against the opposite faces of the rotor 12 by a hydraulically operated caliper assembly 21. The ensuing frictional engagement of the rotating rotor 12 and the nonrotating pads 15 causes gradual wear of the brake lining. Should the lining wear to the extent that the rivets contact the rotor 12, scoring of the rotor would result. The preferred practice is to replace the brake linings well before rivet 20 contact with the rotor 12 occurs. Thus it is desirable that brake wear indication be given when the wear limit is reached. The wear limit is represented by the dotted line 22 in FIGS. 1 and 2. That line is spaced from the backing plate by, say, 4.5 mm. The backing plate 18 extends laterally beyond the lining 14 and contains an aperture 28 to which a sensor 24 is secured. The sensor 24 includes a portion extending from the backing plate 18 toward the rotor 12 to the lining wear limit 22.

Figure 2:
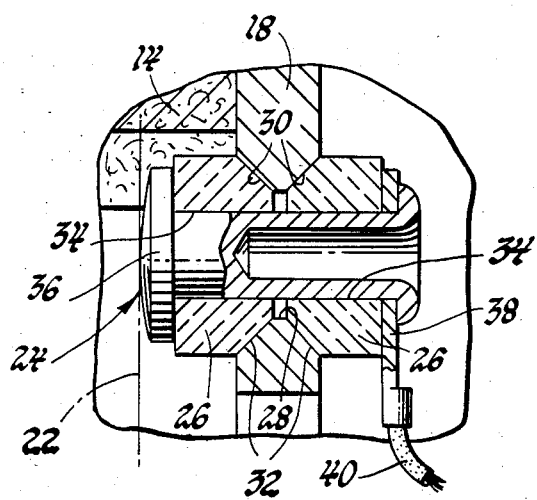
FIG. 2 is an enlarged portion of FIG. 1, further illustrating the sensor according to the invention.

As best shown in FIG. 2, the sensor 24 comprises a pair of semiconductive ceramic bushings 26 which fit on opposite sides of the backing plate 18 and extend partially through the aperture 28 in the plate 18. The aperture is countersunk on both sides to provide beveled surfaces 30. Each bushing 26 includes a chamfered edge 32 which engages a beveled surface 30 of the backing plate 18 to locate the bushings within the aperture 28. The bushings 26 are annular to define inner through-holes 34. A soft metal rivet 36, preferably brass, serves as a sensor contact 36 and extends through the holes 34 of the bushings 26 to secure the bushings to the plate 18. The head of the rivet 36 then is the portion which extends to the wear limit line 22 and which makes contact with the rotor 12 when the wear limit is reached. A connector tab 38 is attached to the sensor by the end of the rivet opposite the contacting head, and connects to a lead wire 40 which, in turn, as shown in FIG. 1, connects to an indicator circuit 42 which has an indicator light 44. Circuit 42 is connected to ground and is also connected to a battery 46 or to a regulated power supply which is also connected to ground. In the automotive vehicle application, the ground comprises the vehicle chassis and thus the rotor 12 and backing plate 18 are also connected to ground.

It is important that the bushings 26 be semiconductive rather than good insulators in order to provide a resistive electrical connection of the contact 36 to the grounded backing plate 18. A wide range of resistance between the contact and backing plate is acceptable for the circuit to be described. An operating range of two ohms to 85,000 ohms is permissible. Satisfactory results have been obtained with a nominal resistance of 2,000 ohms which decreased at high temperatures to about 1,000 ohms. The resistance must always be maintained within the allowable range even though it is exposed to many harsh environmental conditions such as high temperatures, salt water, and dirt. This result may be obtained from a sintered ceramic composition prepared from a powdered mixture initially comprising silicon carbide, silicon nitride, alumina, and yttria. It is preferred that the ceramic material have a bulk resistivity of 10,000 to 100,000 ohm/cm.

A suitable bushing 26 can be formed starting with a powdered ceramic composition containing, by weight, 23.5% silicon carbide (SiC), average particle size 0.1 micron; 40.8% silicon nitride ($Si_3N_4$), average particle size 2 microns; 29.5% alumina ($Al_2O_3$), average particle size 0.3 micron; 5% yttria ($Y_2O_3$), average particle size 2 microns; and about 1.2% Carbowax® 20000. In this mixture, silicon carbide is the electrically conductive material, while silicon nitride is incorporated to increase resistivity, strength, and hardness. The alumina and yttria are employed to provide a glassy binder upon sintering. A small amount of Carbowax 20000 as an initial binder is added, and the powder is ball-milled to form a uniform mixture. Pellets for bushings are pressed from the powder mixture in a hardened steel die using a pressure on the order of 10,000 psi. The pellets are then heated at a maximum temperature of about 475° C. for approximately 90 minutes to burn out the Carbowax. After burnout, the pellets are sintered to a peak temperature of about 1700° C. for 10 minutes. Preferably the pellets are packed in silicon nitride powder during sintering. The nitrogen atmosphere and silicon nitride powder are employed to prevent decomposition of the silicon nitride constituent of the pressed pellets. The pellets are then machined to final dimensions and a hole drilled through them to form the bushing 26. "Green" and/or "bisque" machining or drilling can be employed if the shrinkage factor of the ceramic body upon sintering has been determined so that the final dimensions are held to tolerance. A "green" part is one that is in the as-formed state, i.e., has not been fired. "Bisque" is a term applied to heat-treating a ceramic at about one-half its sintering temperature. This treatment hardens the ceramic so that it can be handled and machined without fear of damage. The advantage of the use of green or bisque machining is that conventional tool steels can be used for drilling and machining ceramic parts. Most fired ceramics require diamond tooling for finish-grinding.

Other ceramic compositions based on silicon carbide and preferably silicon nitride may be employed. The initial powder mixture may include silicon powder rather than silicon nitride powder because silicon can be converted to silicon nitride upon sintering in a nitrogen atmosphere. A suitable balance of silicon carbide and silicon nitride is readily arrived at to provide both a desired resistivity and hardness in the bushing. Preferably the silicon nitride is of relatively fine particle size, such as the 2-micron material described above. It is easier to form a well compacted pellet with fine particle silicon nitride. It is also to be recognized that the conductivity of the bushing can depend on the purity and particle size of the silicon carbide. Small additions of boron, carbon, or nitrogen can decrease the conductivity of SiC, while a small addition of silicon increases conductivity. In general, the smaller the particle size of the SiC, the greater the conductivity of the sintered bushing.

Additions of alumina and yttria (or magnesia, or a rare earth oxide other than yttria) are preferred to form a glassy binder for the silicon carbide and silicon nitride when the mixture is sintered. The alumina and yttria addition also reduces the required sintering temperature for the ceramic body. Depending upon the desired resistivity and hardness of bushing 26, the ceramic body may include, by weight, 10-100% SiC, 0-90% $Si_3N_4$, 0-50% $Al_2O_3$, 0-90% Si, and 0-10% $Y_2O_3$, or a stated alternative oxide.

Figure 3:
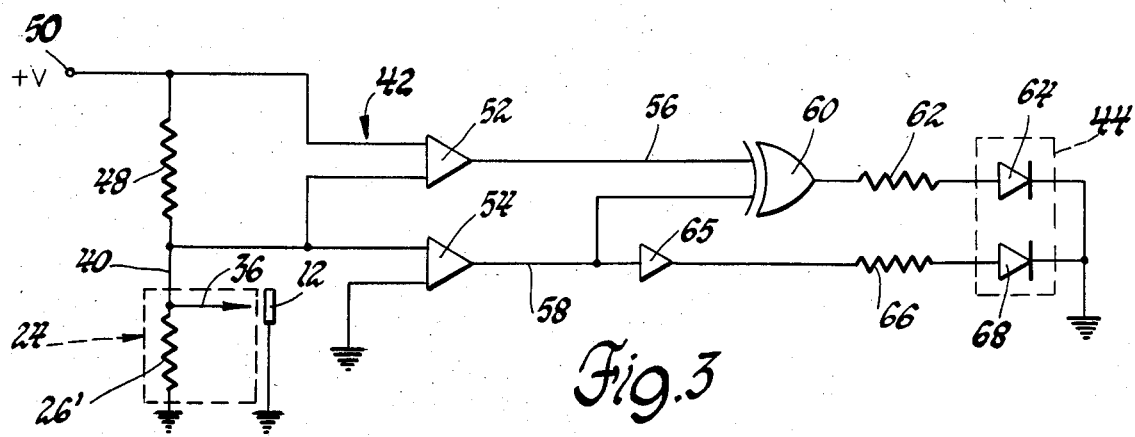
FIG. 3 is a schematic diagram of an indicator circuit according to the invention for use in conjunction with the sensor of FIGS. 1 and 2.

FIG. 3 shows in schematic form the grounded rotor 12 and the sensor 24 including the contact 36 and a resistor 26' which represents the resistance of the bushings 26 between the contact 36 and ground. The lead wire 40 couples the sensor 24 to the indicator circuit 42. The indicator circuit 42 comprises a 10,000-ohm resistor 48 connected between a power supply terminal 50 and the lead wire 40. A first window comparator 52 has its positive input connected to the terminal 50 and one side of the resistor 48 and its negative input connected to the other side of the resistor 48. A second window comparator 54 has its positive input connected to the negative input of the comparator 52 and its negative input connected to ground. The comparators 52 and 54 are coupled by lamp-driving circuitry to the indicator light 44. The output lines 56 and 58 of the comparators 52 and 54 respectively are connected to the inputs of an exclusive OR gate 60. The output of gate 60 is connected through a resistor 62 to the anode of an LED 64 which emits light, preferably red in color when it is energized. The output line 58 of the comparator 54 is fed through a noninverting buffer 65 and a resistor 66 to the anode of a second LED 68 which when energized emits a light, preferably green in color. The cathodes of both LEDs are connected to ground. The LEDs 64 and 68 are packaged together to form the indicator light 44 such that when either one of the LEDs is energized, a red or green indicator light will be visible, but when both LEDs are energized, the blending of the two colors appears to be yellow. The resulting effect is a tri-color LED. Such LED combinations are commercially available, e.g., Part No. LD 100-5, manufactured by Litronix, Inc., of Cupertino, Calif.

In operation, the window comparators 52 and 54 will produce an output signal whenever there is a minimum voltage drop across their respective inputs. As long as the lead wire 40 connects the resistor 48 to the sensor 24, current will flow through the resistor 48 and the resistor 26' to ground, or through the contact 36 and rotor 12 to ground. Thus the comparator 52 will always be turned "on" when the lead wire 40 is effectively connected to the sensor 24. If the lead wire 40 is broken or is disconnected from the sensor 24, there will be no current through the resistor 48 and the comparator 52 will be turned "off". At the same time the power supply voltage will be applied to the positive input of comparator 54 to turn it on. Assuming the lead wire 40 is intact and the contact 36 does not engage the rotor 12, the current flow through the resistor 26' generates sufficient voltage to turn the comparator 54 "on" to produce an output signal on line 58. On the other hand, if the contact 36 engages the rotor 12, as occurs when the brake lining has worn to its limit, there will be essentially no voltage across the comparator 54 input and the comparator 54 will be "off".

The lamp driver logic is dictated by the exclusive OR gate 60 coupling either comparator output to the red LED 64 and by the buffer 65 coupling the output of comparator 54 to the green LED 68. During normal operating conditions, the brake lining has not worn to its limit condition and the lead wire 40 is intact. Both window comparators 52 and 54 are turned "on" so that the exclusive OR gate 60 has no output voltage and only the green LED 68 is illuminated. Thus the green light signifies the normal condition and in particular that the integrity of the sensor connection is maintained. When the brake lining is worn to the wear limit, and the contact 36 engages the rotor 12, the comparator 54 is turned "off" while the comparator 52 is "on" so that only the red LED 64 is illuminated. Thus a red light is a warning of brake lining wear. If the lead wire 40 is broken or disconnected, the comparator 52 is "off" and the comparator 54 is "on" so that both LEDs 64 and 68 are energized to emit a light of yellow appearance. Thus a yellow light is a warning of an open circuit condition.

It will thus be seen that the invention described herein comprising a brake lining wear sensor contact permanently coupled to ground through a semiconductor bushing allows for monitoring not only the brake lining condition but also the connection of the sensor to an indicator circuit. It will also be seen that such a sensor coupled with an indicator circuit provides a simple way to indicate by a tell-tale signal whether the sensor is in circuit with the indicator and, if so, whether the brake lining needs to be replaced.

The embodiments of the invention in which an exclusive property or privilege is claimed are defined as follows:

1. A brake lining wear sensor for brakes having an electrically grounded lining support and an electrically grounded rotor, comprising:

a conductive contact on the lining support at a position corresponding to the desired lining wear limit for making contact with the rotor when the wear limit is attained; and ceramic means for mounting the contact on the grounded lining support to provide an electrically semiconductive path between the contact and grounded lining support, the ceramic means comprising a material containing silicon carbide and having a bulk resistivity on the order of 10,000 to 100,000 ohm/cm, whereby there is normally a substantial resistance between the contact and ground and when the lining is worn to the limit there is an electrical short from the contact to ground.

2. A brake lining wear sensor as claimed in claim 1, wherein the ceramic means comprises silicon carbide and silicon nitride.

3. A brake lining wear sensor as claimed in claim 1, wherein the ceramic means comprises silicon carbide, silicon nitride, alumina, and yttria.

* * * * *